United States Patent [19]

Garcia et al.

[11] 3,763,440

[45] Oct. 2, 1973

[54] TEMPERATURE COMPENSATED SIGNAL GENERATION CIRCUIT EMPLOYING A SINGLE TEMPERATURE SENSING ELEMENT

[75] Inventors: Hernando Javier Garcia, San Francisco, Calif.; Benjamin Roger Peek, Garland, Tex.

[73] Assignee: Integrated Systems Technology, Inc., Garland, Tex.

[22] Filed: Apr. 24, 1972

[21] Appl. No.: 246,627

[52] U.S. Cl. ............... 331/66, 331/116 R, 331/176, 331/161

[51] Int. Cl. ........................... H03b 3/04, H03b 5/36

[58] Field of Search .................. 331/66, 116 R, 161, 331/162, 176

[56] References Cited

UNITED STATES PATENTS

| | | | |
|---|---|---|---|
| 3,322,981 | 5/1967 | Brenig | 331/116 R |
| 3,054,966 | 9/1962 | Etherington | 331/66 |
| 3,508,168 | 4/1970 | Chan | 331/176 X |
| 3,358,244 | 12/1967 | Ho et al. | 331/116 R |
| 3,397,367 | 8/1968 | Steel et al. | 331/66 X |
| 3,581,239 | 5/1971 | Knutson | 331/116 R |
| 3,483,485 | 12/1969 | Scherrer | 331/176 X |
| 3,404,297 | 10/1968 | Fewings et al. | 331/116 R X |
| 3,495,187 | 2/1970 | Jezierski et al. | 331/116 R |

*Primary Examiner*—Roy Lake
*Assistant Examiner*—Siegfried H. Grimm
*Attorney*—Jack A. Kanz

[57] ABSTRACT

A signal generation circuit includes a crystal oscillator for generating an oscillatory signal and a temperature compensation circuit coupled to the oscillator for controlling the capacitance loading of the crystal in the oscillator. The temperature compensation circuit includes a temperature sensing device and operates to develop a first capacitance in a first temperature range, a second capacitance which varies at a ertain rate with the variation in temperature in a second temperature range, and a third capacitance which varies at a different rate with the variation in temperature in a third temperature range.

10 Claims, 1 Drawing Figure

Patented Oct. 2, 1973 3,763,440
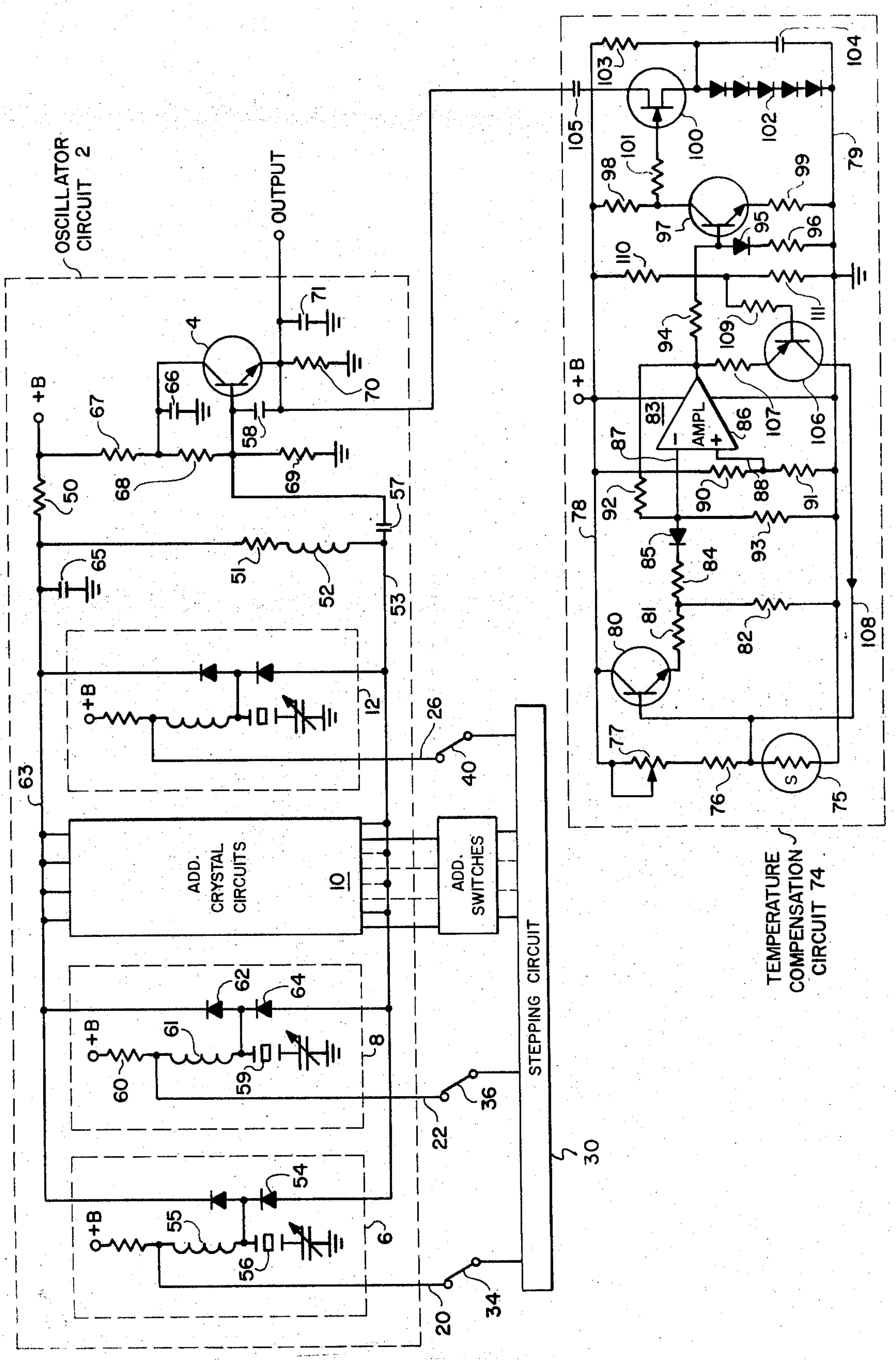

TEMPERATURE COMPENSATED SIGNAL GENERATION CIRCUIT EMPLOYING A SINGLE TEMPERATURE SENSING ELEMENT

BACKGROUND OF THE INVENTION

This invention relates to signal generation circuits and more particularly to temperature compensated signal generation circuits.

Although crystal oscillators have a high degree of frequency stability, such oscillators are, nevertheless, affected by surrounding temperature changes. Such temperature changes cause the crystal materials to expand or contract and this change in the dimensions of the crystals changes the natural frequency thereof. A variety of solutions have been proposed for preventing such shift in crystal frequency including placement of the crystal in a temperature-controlled oven so that the crystal's temperature does not change. The use of temperature-controlled ovens, although generally effective, is rather expensive and cumbersome. Compensation circuits have also been employed to offset the effects of temperature changes on the crystals. Such circuits are less expensive but generally produce less satisfactory results one reason being that the variation in the frequency of the crystal with temperature variation is not linear; accurate compensation is therefore difficult to achieve. Furthermore, few, if any, compensation circuits presently available are suitable for use with multiple crystal (i.e. multiple frequency) oscillators.

SUMMARY OF THE INVENTION

It is an object of the present invention to provide a new and improved temperature compensation circuit for crystal oscillators.

It is another object of the present invention to provide a temperature compensation circuit suitable for use with multiple crystal oscillators.

It is still another object of the present invention to provide a temperature compensation circuit which more accurately compensates for temperature changes in crystal oscillators in which the frequency varies nonlinearly with the temperature changes.

These and other objects of the present invention are realized in a specific illustrative embodiment which includes a crystal oscillator having one or more crystal circuits for generating oscillatory signals and a temperature compensation circuit coupled to the oscillator for controlling the capacitance loading of the crystal or crystals of the oscillator. The temperature compensation circuit operates to develop a first capacitance in a first temperature range, a second capacitance which varies at a certain rate with the variation in temperature in a second temperature range and a third capacitance which varies at a rate different from the first rate with the variation in temperature in a third temperature range. By varying the capacitance loading of the crystal or crystals, the crystal frequency is shifted to offset any shift caused by temperature change.

BRIEF DESCRIPTION OF THE DRAWINGS

A complete understanding of the present invention and of the above and other objects and advantages thereof may be gained from a consideration of the following detailed description of a specific illustrative embodiment presented in connection with the accompanying drawing which shows a temperature compensated signal generator made in accordance with the present invention.

DETAILED DESCRIPTION

The circuit of the drawing includes an adjustable oscillator circuit 2 which is capable of generating a sine wave signal at any one of a plurality of different frequencies. Such frequencies might, for example, be in the radio signal frequency range. The oscillator circuit 2 includes a transistor 4 and a set of identical and individual crystal circuits 6–12 which operate in a one-at-a-time manner to provide the different frequency signals. Only the first two crystal circuits 6 and 8 and the last crystal circuit 12 are shown in detail. Other than the frequency of the particular crystal used in each of these circuits, the circuits are of an identical construction.

The operative status of each of the crystal circuits 6–12 is determined by the voltage condition on conductors 20–26 respectively. The voltage condition on these conductors is, in turn, controlled by a stepping circuit 30 and the settings of a set of selector switches 34–40. The switches 34–40 are provided to enable or disable selection of the corresponding crystal circuits by the stepping circuit 30.

Assuming that a particular one of the switches 34–40 is closed so as to connect the corresponding one of the conductors 20–26 to the stepping circuit 30, then the corresponding crystal circuit 6–12 may be turned on or activated by the stepping circuit 30 placing the movable element of the particular switch at ground level voltage and placing the movable elements of the remainder of the switches in an open circuit condition. The particular switch selected is controlled by control signals applied to the stepping circuit 30. An exemplary stepping circuit 30 is disclosed and described in copending U.S. Pat. application Ser. No. 232,470, filed Mar. 7, 1972. When a selector switch is closed and its movable element is grounded by the stepping circuit 30, the crystal circuit to which the selector switch is connected is "activated," i.e., the crystal of that crystal circuit is, in effect, connected to the base of the transistor 4. Conversely, when a selector switch is open or when the corresponding stepping circuit output line is in an open circuit condition, the crystal circuit connected to that switch is disabled so that, in effect, the crystal of that crystal circuit is disconnected from the transistor 4.

To illustrate the operation of a particular crystal circuit, assume that crystal circuit 6 is activated (control conductor 20 grounded) and that the remainder of the crystal circuits 8–12 are disabled (control conductors open circuited). When the control conductor 20 is grounded, current flows from a +B power supply through a resistor 50, a resistor 51, a choke coil 52, a conductor 53, a diode 54, and a choke coil 55 to the control conductor 20 and thus to ground. In this mode, diode 54 is conductive thereby, in effect, connecting the upper terminal of crystal 56 by way of a capacitor 57 to the base of the transistor 4. This transforms the circuit associated with the transistor 4 into a crystal controlled oscillator circuit with the resonant frequency thereof being determined by the crystal 56. Feedback by way of capacitor 58 provides the energy for keeping the crystal 54 oscillating with oscillation of the crystal 54 initially being induced by the electrical noise in the circuit.

The open circuit condition on control conductor 22 of the second crystal circuit 8 causes the crystal 59 thereof to, in effect, be disconnected from the transistor 4. Specifically, with the lower end of the control conductor 22 open circuited, current flows from the +B power supply through resistor 60, choke coil 61, diode 62, conductor 63, resistor 51, choke coil 52, diode 54, choke coil 55, control conductor 20 and switch 34 to ground. Since the anode of diode 64 is at almost ground potential while the cathode is at a positive potential somewhat less than the +B power supply potential, the diode 64 is non-conductive and the crystal 59 is, in effect, disconnected from the transistor 4. At the same time, the upper terminal of the crystal 59 is effectively grounded from an alternating current standpoint by way of diode 62 (which is conductive) and capacitor 65. Choke coil 52 presents a relatively high alternating current impedance to further insure that no oscillations from the crystal 59 can reach the transistor 4 by way of the circuit branch formed by such coil 52 and resistor 51. The remainder of the crystal circuits 10–12 are at this time also disconnected from the transistor 4 in the same manner as for the crystal circuit 8.

The collector of the transistor 4 is connected to an intermediate point on a voltage divider formed by series connected resistors 67, 68 and 69, the upper end of resistor 67 being connected to the +B power supply and the lower end of resistor 69 being connected to circuit ground. Resistor 67 is of relatively small value compared to resistors 68 and 69 and as such it cooperates with a capacitor 66 to prevent oscillatory signal components from reaching the +B supply terminal. The emitter of the transistor 4 is connected to circuit ground by way of a biasing network formed by a resistor 70 and a capacitor 71. The oscillatory signals developed by the oscillator circuit 2 are applied to the output terminal connected to the emitter of the transistor 4.

The circuit of the drawing also includes a temperature compensation circuit 74 for stabilizing the operation of the oscillator 2 in the event of changes in the surrounding temperature in the environment in which the circuit is being used. The temperature compensation circuit 74 is constructed to operate in a certain compensation mode when the temperature falls below a first threshold level and then to operate in a different compensation mode when the temperature falls below a second threshold level which is lower than the first threshold level. In other words, the temperature compensation circuit 74 changes operating characteristics in different temperature ranges to provide the needed compensation in those ranges. For this type of temperature compensation, the crystals utilized in the oscillator circuit 2 would be of a type whose frequency stability was fairly high above the threshold temperature and whose frequency decreases by a certain percentage as the temperature decreases below the first threshold level. Of course, if the frequency decreases by a certain percentage as temperature decreases, then the absolute rate of change of frequency becomes less and less as the temperature decreases. Since the rate of frequency change itself changes with the change in temperature below the first threshold level, two compensation modes each having a different compensation "rate" are provided to more accurately offset the effects of temperature change.

The temperature compensation circuit 74 includes a linear positive temperature coefficient sensing device 75 for sensing the ambient temperature in the immediate vicinity of the oscillator circuit 2. The sensing device 75 is connected in series with resistors 76 and 77 with this series circuit branch being connected at one end to a conductor 78 running to a direct current power supply terminal +B and at the other end to a conductor 79 connected to circuit ground. The upper terminal of temperature sensor 75 is connected to an emitter-follower circuit formed by a transistor 80 and series connected emitter resistors 81 and 82. The junction between resistors 81 and 82 is coupled to the input of an operational amplifier circuit 83 by way of a resistor 84 and a diode 85. The operational amplifier circuit 83 includes a differential amplifier 86 having a high gain and including an inverting input terminal 87 and a non-inverting input terminal 88. The anode of the diode 85 is connected to the inverting input terminal 87 while the non-inverting input terminal 88 is connected to an intermediate point on a voltage divider formed by resistors 90 and 91, these resistors being connected in series between the +B supply voltage conductor 78 and the circuit ground conductor 79. A feedback path or resistor 92 is connected between the output and the inverting input of the amplifier 86. The resistor 93 is connected between the inverting input 87 and the circuit ground conductor 79. The output of the amplifier 86 is connected by way of a resistor 94, a diode 95 and a resistor 96 to an amplifier stage formed by a transistor 97. The collector of the transistor 97 is connected to the +B supply voltage conductor 78 by a resistor 98 while the emitter of the transistor 97 is connected to the circuit ground conductor 79 by way of a resistor 99. Transistor 97 drives an output stage formed by a field effect transistor 100. The gate electrode of the transistor 100 is connected to the collector of transistor 97 by resistor 101. The source electrode of transistor 100 is connected by way of series connected diodes 102 to the circuit ground conductor 79. A resistor 103 is connected between the +B supply conductor 78 and the source electrode of transistor 100 while a capacitor 104 is connected between the source electrode and the circuit ground conductor 79. Diodes 102, resistor 103 and capacitor 104 provide a bias circuit for the field effect transistor 100. The drain electrode of transistor 100 is coupled by way of a capacitor 105 to the emitter of the transistor 4 in the oscillator circuit 2.

The temperature compensation circuit 74 further includes a negative feedback path between the output of amplifier 86 and the upper terminal of the temperature sensor 75. This negative feedback path includes a transistor 106 having its emitter connected to the output of amplifier 86 by a resistor 107 and having its collector connected to the upper terminal of the temperature sensor 75 by conductor 108. The base of transistor 106 is connected by way of a resistor 109 to an intermediate point of a voltage divider formed by resistors 110 and 111.

The temperature compensation circuit 74 functions to control the frequency of oscillation of the oscillator 2 by varying the capacitance loading onto the crystals 56, 59, etc. as they are connected to the base electrode of transistor 4. The greater the loading, the lower the frequency of oscillation and vice versa. In the present embodiment, the temperature compensation circuit 74 is constructed to remain in a passive condition so long as the surrounding environmental temperature is greater than a first temperature threshold level. In this passive condition, diode 85 and transistor 106 are nonconductive and the amplifier 86 develops a fixed, positive polarity direct current outut voltage at its output terminal. This fixed voltage drives the transistor 97 which, in turn, drives the field effect transistor 100. The circuit is constructed so that in the passive condition the field effect transistor 100 is maintained in a fairly high conductive condition so as to provide a maximum of loading on the crystal and oscillator 2. This loading is selected such that the oscillator crystals oscillate at the proper frequencies at temperatures above the first temperature threshold level.

As the ambient temperature in the oscillator circuit 2 decreases, the resistance of the temperature sensor 75 also decreases. This, in turn, causes the voltage at the upper terminal of the temperature sensor 75 to decrease which then causes the voltage at the junction between emitter-follower resistors 81 and 82 to decrease (since transistor 80 conducts less because of a lower voltage at its base). As the temperature falls below the first temperature threshold level, the voltage at the junction between resistors 81 and 82 decreases to the point where diode 85 becomes conductive. The point at which the diode 85 becomes conductive may be varied by appropriate adjustment of variable resistor 77 and thus the first temperature threshold level may be varied. When the diode 85 becomes conductive, the voltage at the inverting input terminal 87 of amplifier 86 is lowered causing the amplifier to produce a larger output voltage. This output voltage is fed back by way of resistor 92 so as to cause the net voltage at the input terminal 87 to remain substantially the same as it was before. Of course, the characteristics of an operational amplifier are that very small changes in the voltage level at the inverting input causes large changes at the amplifier output.

As described, as the temperature decreases below the first temperature threshold level, the voltage at the output of the amplifier 86 increases. This increase the conduction in transistor 97 and decreases the drive to the field effect transistor 100 so that the transistor 100 becomes less conductive. This decreases the capacitance loading on the crystal and oscillator circuit 2 and thus tends to increase the frequency of oscillation. This offsets the decrease in the frequency of oscillation which occurs for the lower ambient temperature because of the inherent temperature characteristics of the crystal. Thus, the frequency of oscillation remains substantially constant.

As the ambient temperature continues to decrease, as already described, the rate of change of frequency becomes less and less so that the compensation provided by the temperature compensation circuit 74 becomes somewhat less effective. To account for this, when the ambient temperature decreases to a second temperature threshold level, the temperature compensation circuit 74 commences operation in a different compensation mode. Specifically, as the temperature decreases to the second temperature threshold level, the transistor 106 becomes conductive. The point at which the transistor 106 becomes conductive is determined by the voltage dividing ratio of resistors 110 and 111, this ratio determining the bias voltage supplied to the base of the transistor 106. With the transistor 106 conductive, current flows from the collector thereof by way of feedback conductor 108 and temperature sensor 75 to circuit ground. This is a negative-type feedback in that the voltage decrease across the temperature sensor 75 caused by the decrease in temperature is partially offset by the current supplied via the feedback path 108 which tends to increase the voltage drop across the temperature sensor 75. As the temperature continues to decrease, the voltage at the output of the amplifier 86 increases and this, in turn, increases the feedback current supplied by way of conductor 108. Thus, the voltage at the output of the amplifier 86 does not increase as rapidly for decreases in temperature below the second temperature threshold level as it does for decreases in temperature below the first temperature threshold level but above the second temperature threshold level. As already indicated, this modifies the control action of the field effect transistor 100 so that the temperature compensation provided by the temperature compensation circuit 74 corresponds more closely to the temperature characteristics of the crystals in the oscillator circuit 2.

In the above-described manner crystal frequency variations caused by temperature changes below a certain temperature threshold level are offset by appropriately varying the capacitance loading of the crystals. Because the crystal frequency variations are nonlinear, two compensation modes are provided so that the compensation corresponds more closely to the frequency variation of the crystals.

It is to be understood that the above-described arrangement is only illustrative of the application of the principles of the present invention. Numerous other arrangements may be devised by those skilled in the art without departing from the spirit and scope of the invention. For example, the temperature compensation circuit could include additional negative feedback circuitry to provide additional temperature threshold levels, below the first and second temperature threshold levels, at which the temperature compensation circuit would commence operating in still additional compensation modes. Thus, additional feedback current could be supplied to the temperature sensor to offset the decrease in voltage caused by decreasing temperature.

What is claimed is:

1. A signal generation circuit including a crystal oscillator for generating an oscillatory signal, a loading capacitor one side of which is coupled to said oscillator, a controlled variable impedance means having first and second power electrodes connected in series between said loading capacitor and ground potential and a gate electrode, the impedance between said power electrodes varying in response to a voltage applied to said gate electrode, temperature sensing means for producing a voltage proportional to the ambient temperature, means for producing a control voltage having a substantially fixed level in response to the voltage produced by said temperature sensing means in a first temperature range, means for producing a control voltage which varies at a certain rate in response to variations in the voltage produced by said temperature sensing means in a second temperature range, means for producing a control voltage which varies at a different rate in response to variations in the voltage produced by said temperature sensing means in a third temperature range and including a feedback circuit for applying a portion of said control voltage to said sensing means to thereby vary the voltage produced by said sensing means in accordance with variations in the control voltage to thus change the rate at which the control voltage varies as a result of temperature variations, and means for applying to the gate electrode of said controlled variable impedance means a voltage determined by said control voltage.

2. A signal generation circuit as in claim 1 wherein said controlled variable impedance means includes a field effect transistor whose source and drain electrodes are connected in series between said loading capacitor and ground potential and whose gate electrode is connected to said voltage applying means.

3. A signal generation circuit as in claim 2 wherein said controlled variable impedance means further includes a diode connected between the source electrode of the field effect transistor and ground potential.

4. A signal generation circuit as in claim 1 wherein said temperature sensing means is a positive temperature coefficient impedance means.

5. A signal generation circuit as in claim 1 wherein said control voltage producing means comprise amplifier means responsive to an input voltage for generating a control voltage inversely proportional to the input voltage, first means for maintaining the input voltage at a substantially fixed level when the voltage produced by said temperature sensing means exceeds a biasing threshold level and for varying the input voltage in accordance with variations in the voltage produced by said temperature sensing means when the voltage produced by said temperature sensing means falls below said biasing threshold level, and second means responsive to the control voltage exceeding an activating threshold level for applying a portion of said control voltage to said feedback circuit.

6. A signal generation circuit as in claim 5 wherein said amplifier means comprises an operational amplifier.

7. A signal generation circuit as in claim 5 wherein said first means comprises a voltage divider network coupled to said temperature sensing means, and a diode interconnecting one leg of the voltage divider network to the input of said amplifier means.

8. A signal generation circuit as in claim 5 wherein said second means comprises a transistor whose emitter and collector are connected in series between the output of said amplifier means and said temperature sensing means.

9. A signal generation circuit including a plurality of crystal circuits each comprising a crystal and a capacitor interconnecting one terminal of the crystal with ground potential, a transistor whose base electrode is selectively coupled to the other terminal of each crystal and whose emitter serves as an output terminal, a capacitor interconnecting the base of the transistor with the emitter thereof, a capacitor interconnecting the emitter of the transistor with ground potential, and a temperature compensation circuit coupled to the emitter of the transistor and including temperature sensing means for producing a voltage proportional to the ambient temperature and circuitry operable in response to said temperature sensing means to develop a first capacitance in a first temperature range, to develop a second capacitance which varies at a certain rate with the variation in temperature in a second temperature range, and to develop a third capacitance which varies at a different rate with the variations in temperature in a third temperature range.

10. A signal generation circuit as in claim 9 wherein said temperature compensation circuit includes a loading capacitor one side of which is connected to the emitter of the transistor, controlled variable impedance means having first and second power electrodes connected in series between the other side of said loading capacitor and ground potential and a gate electrode, the impedance between said power electrodes varying in response to a voltage applied to said gate electrode, means for producing a control voltage having a substantially fixed level in response to the voltage produced by said temperature sensing means in said first temperature range, means for producing a control voltage which varies at a certain rate in response to variations in voltage produced by said temperature sensing means in said second temperature range, means for modifying the rate of variation of the control voltage in said third temperature range, and means for applying to the gate electrode of said controlled variable impedance means a voltage determined by said control voltage.

* * * * *